(12) United States Patent
Wade

(10) Patent No.: US 6,273,127 B1
(45) Date of Patent: Aug. 14, 2001

(54) PRESSURE RELIEF VALVE ASSEMBLY

(75) Inventor: David Arthur Wade, Plymouth Township, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/438,351

(22) Filed: Nov. 11, 1999

(51) Int. Cl.[7] .................................................. F16K 15/00
(52) U.S. Cl. ............................. 137/512.15; 137/512.15; 454/165
(58) Field of Search ...................... 137/512.15, 512.1; 454/162, 164, 165

(56) References Cited

U.S. PATENT DOCUMENTS

| | | |
|---|---|---|
| 3,438,527 | 4/1969 | Gamblin, Jr. . |
| 3,520,243 * | 7/1970 | Wessells, III ........................ 454/162 |
| 4,412,432 | 11/1983 | Brendel . |
| 4,915,128 | 4/1990 | Masserini . |
| 5,105,849 | 4/1992 | Clough . |
| 5,167,574 * | 12/1992 | Ikeda et al. .......................... 454/164 |
| 5,492,505 | 2/1996 | Bell et al. . |
| 5,503,178 | 4/1996 | Miskelley et al. . |
| 5,601,117 * | 2/1997 | Lewis et al. ...................... 454/162 X |
| 5,695,397 * | 12/1997 | Frank et al. .......................... 454/164 |
| 5,727,999 * | 3/1998 | Lewis .................................... 454/162 |
| 5,794,654 | 8/1998 | Marvonek . |
| 5,823,870 * | 10/1998 | Emerling et al. ..................... 454/162 |
| 5,890,959 | 4/1999 | Pettit et al. . |
| 6,026,852 * | 2/2000 | Barton et al. .................... 137/512.15 |

FOREIGN PATENT DOCUMENTS

| | | | |
|---|---|---|---|
| 2610731 * | 1/1978 | (DE) | ..................................... 454/164 |
| 2742667 * | 3/1979 | (DE) | ..................................... 454/164 |

* cited by examiner

*Primary Examiner*—Michael Powell Buiz
*Assistant Examiner*—Meredith H. Schoenfeld
(74) *Attorney, Agent, or Firm*—Ford Global Tech. Inc.

(57) ABSTRACT

A pressure relief valve assembly 10 including a generally rectangular member or housing 12, four generally flat and rectangular "flaps" or movable members 14, 16, 18, and 20, and eight substantially identical fastening members 24–34. Members 14–20 are pivotal along respective axes 78–84 which are each disposed at an angle 86 with respect to the longitudinal axis 60 of housing 12, and which allow assembly 10 to be operatively disposed in multiple positions and orientations.

17 Claims, 3 Drawing Sheets

PRESSURE RELIEF VALVE ASSEMBLY

FIELD OF THE INVENTION

This invention relates to a valve assembly and more particularly, to a pressure relief valve assembly which allows air to be discharged or expelled from a vehicle passenger compartment and which may be operatively disposed in multiple positions and orientations.

BACKGROUND OF THE INVENTION

Valve assemblies are used within automotive vehicles and other apparatuses to control, manage and/or direct the flow of air, gas, and other material between various respective portions of these vehicles or apparatuses and/or between various portions of these vehicles or apparatuses and the environment or area in which these respective vehicles and apparatuses reside.

One type of valve assembly, known as a pressure relief valve assembly or an "air extractor", is typically connected, by way of one or more ducts, conduits, and/or vents, to the passenger compartment of a vehicle. The valve assembly operatively allows air to be selectively expelled, discharged or extracted from the vehicle passenger compartment, while substantially preventing air, gas, fumes, and/or other undesirable materials from entering into the passenger compartment. Particularly, these pressure relief valve assemblies are effective to substantially eliminate pressure differentials which exist or may arise between the passenger compartment and the environment outside of the vehicle. Such pressure differentials arise, for example and without limitation, when the vehicle doors are opened or closed, when the vehicle is traveling at relatively high speeds, and/or when the vehicle climate control systems are activated. By eliminating and/or substantially reducing these pressure differentials, these pressure relief valve assemblies improve the performance of climate control systems, reduce door-closing efforts, minimize window frame deflection, and reduce noise within the passenger compartment of the vehicle.

Pressure relief valve assemblies typically include a generally rectangular housing and a plurality of "flaps" or movable members, which are pivotally disposed within the housing and which rest against and/or operatively cover several apertures which are integrally formed within the housing. These flaps or movable members are typically and conventionally mounted along an axis which is parallel to the longitudinal axis of the housing and which is adapted to be substantially parallel to the ground or the floor of the vehicle, when the valve assembly is properly installed within a vehicle. In this manner, the weight of the flaps (i.e., the gravitational force on the flaps) allows the flaps to open only when air is being expelled from the passenger compartment, and causes the flaps to close by the gravitational force of their own weight, when air and/or air-borne material is not being expelled from the passenger compartment, thereby substantially preventing air, gas, fumes, and/or other materials from entering the passenger compartment from the exterior of the vehicle through the valve assembly.

Pressure relief valve assemblies are typically mounted in the rear portion of the vehicle (e.g., as far away from the occupants of the passenger compartment as possible), in order to minimize the amount of noise which is introduced and/or communicated into the passenger compartment due to and/or arising from the operation of these valve assemblies. These types of valve assemblies are also desirably mounted in an area of the vehicle where they are substantially not visible to the occupants of the passenger compartment, and where the ingress of carbon monoxide or exhaust fumes is relatively unlikely. Due to these mounting constraints and the relatively limited amount of available mounting space on and/or within most vehicles, it is desirable to employ valve assemblies which may be operatively mounted in a variety of positions and orientations, thereby maximizing the areas or portions of the vehicle in which the assemblies may be operatively mounted, and further providing a "standard" or "universal" valve assembly which may be used in a wide variety of vehicles, thereby minimizing vehicle production costs.

While the previously described valve assemblies are relatively effective to operatively and communicatively expel air from the passenger compartment, they suffer from some drawbacks due to their relatively limited ability and/or inability to be operatively mounted in multiple orientations and/or positions. Particularly, because these prior valve assemblies rely upon gravitational forces to "automatically" close, and since the flaps of these prior valve assemblies are arranged along an axis which is substantially parallel to the longitudinal axis of the housing, these prior valve assemblies cannot be installed in a variety of orientations with respect to the ground or the floor of the vehicle.

That is, when "vertically" installed (e.g., when the longitudinal axis of symmetry of the housing is substantially perpendicular to the ground or the floor of the vehicle), the flaps do not properly and automatically close. As such, once these flaps pivot or move to an open position, they remain substantially open, thereby undesirably allowing air, gas, fumes and/or other materials to undesirably enter the passenger compartment. Moreover, these prior valve assemblies are typically mountable to the vehicle body either from only the "outside" of the vehicle body or from only the "inside" of the vehicle body, thereby reducing the utility of theses prior valve assemblies, further limiting the areas within which these valve assemblies may be mounted, and preventing these prior valve assemblies from use within a wide variety of vehicles.

There is therefore a need for a new and improved pressure relief valve assembly for use in a vehicle and which allows air to be selectively expelled from the vehicle passenger compartment, while substantially preventing air, gas, fumes and/or other undesirable materials from flowing into the vehicle passenger compartment; which may be operatively mounted to the vehicle body in multiple orientations with respect to the ground or to the floor of the vehicle; and which may be mounted to the vehicle body from either the inside of the vehicle body or from the outside of the vehicle body, thereby allowing use in a wide variety of vehicles.

SUMMARY OF THE INVENTION

It is a first object of the invention to provide a valve assembly which overcomes some or all of the previously delineated drawbacks of prior valve assemblies.

It is a second object of the invention to provide a valve assembly for use in a vehicle, which allows air to be expelled from the vehicle passenger compartment while substantially preventing air, gas, fumes, and/or other undesirable materials from flowing into the vehicle passenger compartment.

It is a third object of the present invention to provide a valve assembly for use within a vehicle which may be mounted to the vehicle in a substantially "horizontal" orientation (e.g., along an axis which is substantially parallel to the ground or to the floor of the vehicle) and a substantially "vertical" orientation (e.g., along an axis which is substantially perpendicular with respect to the ground or to the floor of the vehicle).

It is a fourth object of the present invention to provide a valve assembly for use within a vehicle which may be mounted from either the interior or the exterior of the vehicle's body.

It is a fifth object of the product invention to provide a valve assembly for use within a vehicle and which selectively and operatively removes air from the vehicle independent of mounting orientation.

According to a first aspect of the present invention, a valve assembly for use in discharging air from a portion of a vehicle having a floor is provided. The valve assembly includes: a housing having a longitudinal axis which forms a first angle with the floor, the first angle having a value; a first member which is disposed within the housing and which includes at least one opening through which the air selectively passes; and at least one selectively movable second member which is pivotally coupled to the first member along an axis which forms a second angle with respect to the longitudinal axis, the second angle being effective to cause said at least one selectively movable second member to operatively and selectively cover said first opening when the value of the first angle is between approximately zero degrees and approximately ninety degrees.

According to a second aspect of the present invention a method for producing a valve assembly for use in discharging air from a passenger compartment of a vehicle of the type having a floor, is provided. The method includes the steps of: providing a generally rectangular housing having at least one aperture through which the air may be selectively discharged; mounting the housing within the vehicle in a certain orientation; providing at least one member; and pivotally attaching the at least one member to the housing, effective to cause the at least one member to be operatively movable from a first position in which the aperture is covered to a second position remote from the apertures, the member being operatively movable between the first and second positions independent of the orientation of the housing within the vehicle.

These and other objects, aspects, features, and advantages of the present invention will become apparent from a consideration of the following specification and the attached drawings.

DETAILED DESCRIPTION OF THE PREFERRED EMBODIMENT OF THE INVENTION

Figure 1:
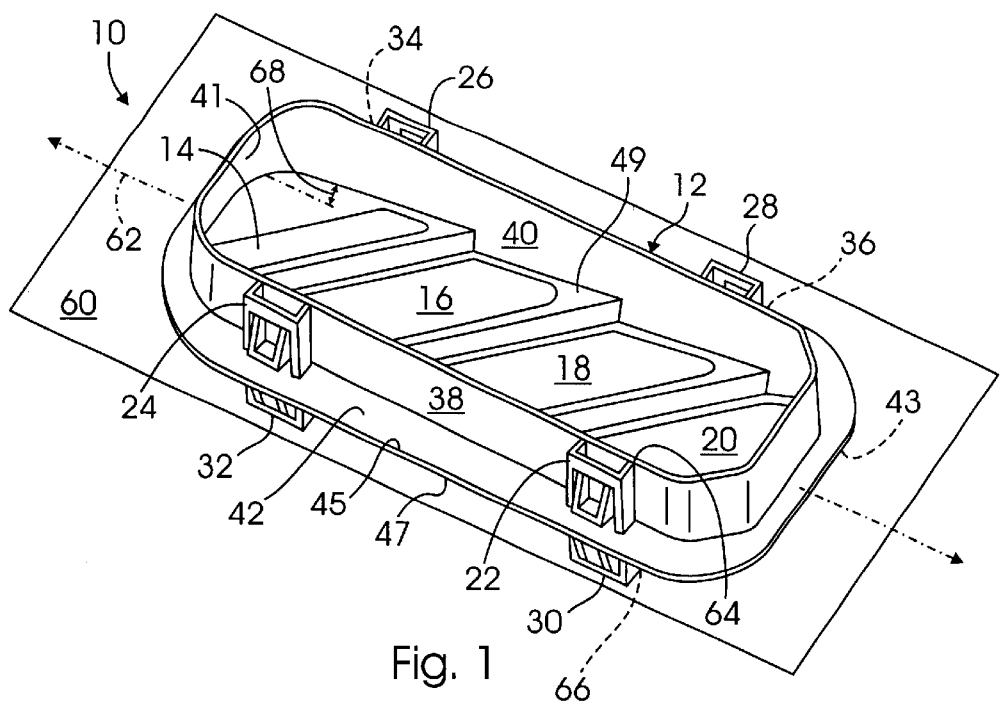
FIG. 1 is a perspective view of a valve assembly which is made in accordance with the teachings of the preferred embodiment of the invention.

Referring now to FIGS. 1 through 6, there is shown a pressure relief valve assembly 10 which is made in accordance with the teachings of the preferred embodiment of the invention. As shown, valve assembly 10 includes a generally rectangular member or housing 12, four generally flat and rectangular "flaps" or movable members 14, 16, 18, and 20, and eight substantially identical fastening members 22–36.

Assembly 10 is adapted for use within a vehicle and, as described more fully and completely below, is adapted to be operatively and communicatively connected by way of a conduit, passage, or vent to a certain portion or region of a vehicle (e.g., the passenger compartment), and to allow air to be expelled from the certain portion of the vehicle (e.g., the passenger compartment) to another area, region, or environment (e.g., the ambient environment outside of or external to the vehicle). It should be appreciated by one of ordinary skill in the art that valve assembly 10 may be used to replace a conventional pressure relief valve or an "air extractor" within a vehicle. While the following discussion describes the use of assembly 10 as a "pressure relief valve" or as an "air extractor", it should be realized that assembly 10 may also be used in any other suitable manner to control the flow of air between portions or regions of a vehicle or other device and/or assembly.

Member 12 is preferably manufactured from a durable material, such as without limitation plastic, metal, or a composite material. In one non-limiting embodiment, member 12 is manufactured from a plastic material by way of a conventional molding process. Member 12 includes a first generally rectangular portion 38 having and/or forming a cavity or channel 40 and an integrally formed and orthogonally projecting flange or ridge portion 42 which is peripherally and protrudingly disposed around portion 38. Particularly, ridge 42 is disposed approximately midway between the top edge 64 of portion 38 and bottom edge 66 of portion 38, and resides substantially within plane 60 which lies substantially along the longitudinal axis 62 of housing 12 and which forms a plane of symmetry for portion 38. Ridge 42 includes a front "side" or surface 45 and a back "side" or surface 47.

Channel 40 includes a first generally rectangular aperture 43 which, in one non-limiting embodiment, is coupled by way of a passage, vent, or other conduit (not shown) to a first portion or region (e.g., the passenger compartment of a vehicle) and which operatively receives air from that region (e.g., the passenger compartment), and a second generally rectangular aperture 41, through which the received air is expelled. Apertures 41, 43 are each respectively and substantially contained within planes 61, 63 which, in one non-limiting embodiment, are each substantially parallel to plane 60.

Figure 2:
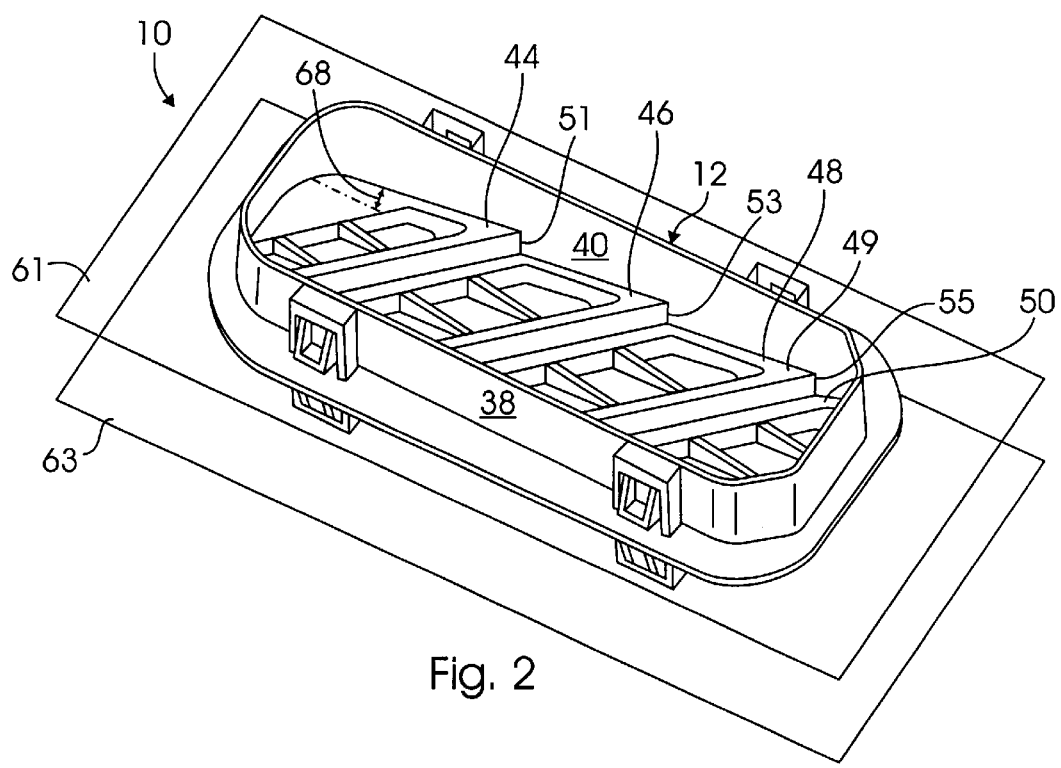
FIG. 2 is a perspective view of the valve assembly which is shown in FIG. 1 and further illustrating the valve assembly with its flaps removed.

An air passage, conduit or vent member 49 is integrally formed within channel 40. As shown, member 49 includes four sections, surfaces, or portions 44, 46, 48, and 50, each of which respectively contains or includes a plurality of substantially similar, generally rectangular, and integrally formed apertures, openings, or "vents" 52, 54, 56, and 58. As best shown in FIG. 2, portions 44 and 46 are connected or coupled together by way of a member or surface portion 51 which is integrally formed within member 49; portions 46 and 48 are connected or coupled together by way of a member or surface portion 53 which is integrally formed within member 49; and portions 48, 50 are coupled together by way of a member or surface 55 which is integrally formed within member 49. Each portion 44–50 is "angled" or is disposed at a substantially identical angle 68 with respect to plane 60. It should be appreciated that portions 44–50 are also disposed at a substantially identical angle (e.g., an angle substantially equal to angle 68) with respect to each of the planes 61, 63. In one non-limiting embodiment, angle 68 is equal to approximately 45 degrees, and in other alternate non-limiting embodiments angle 68 may be equal to other values. In one non-limiting embodiment, portions 44–50 collectively and integrally comprise a single member or surface which substantially resides within plane 60.

Figure 3:
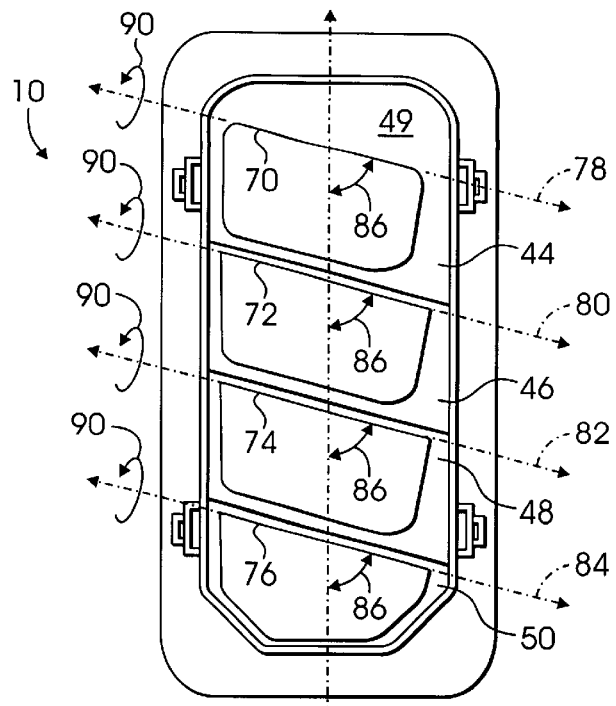
FIG. 3 is a front view of the valve assembly shown in FIG. 1.
Figure 4:
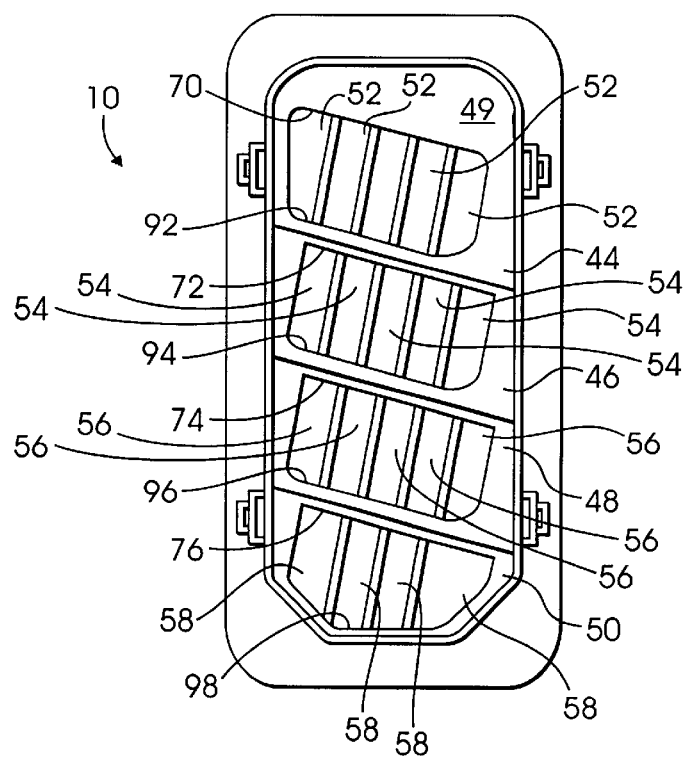
FIG. 4 is a front view of the valve assembly shown in FIG. 1 and further illustrating the valve assembly with its flaps removed.

Flaps 14–20 are preferably made or formed from a resilient material such as a conventional and commercially available rubber or plastic material. Particularly, flaps 14–20 are respectively, conventionally, and pivotally coupled along the edges 70–76 and are respectively adjacent to apertures 52–58, as shown in FIGS. 3 and 4. In this manner, flaps 14–20 respectively pivot along axes 78–84 which respectively and substantially lie along edges 70–76. Each axis 78–84 is disposed at a substantially identical angle 86 with respect to axis 62, which, in the preferred embodiment of the invention, is equal to approximately 45 degrees. In other alternate embodiments, angle 86 is equal to other values and may be equal to different values for each axis 78–84. In one alternate embodiment, flaps 14–20 are not coupled to edges 70–76, but rather are respectively, conventionally, and pivotally coupled to edges 92–98.

In the preferred embodiment of the invention, fasteners 22–36 are conventional "clip" type fasteners which are adapted to clip or "snap" into corresponding apertures or openings contained or located within a vehicle body or component. In other alternate embodiments, fasteners 22–36 may comprise any type of suitable fasteners such as screws, pins, bolts, tabs, adhesive members, and/or may comprise openings or apertures which are adapted to operatively receive conventional fasteners. Fasteners 22–28 are disposed on the "front" surface 45 of ridge 42, and fasteners 30–36 are disposed on the "rear" or back surface 47 of ridge 42. Because fasteners 22–28 and 30–36 are respectively and operatively extend in "opposite" directions and upon opposite sides of ridge 42, assembly 10 may be installed from and/or mounted to either the outside or exterior surface of a vehicle body (e.g., by way of fasteners 30–36) or the inside or interior surface of a vehicle body (e.g., by way of fasteners 22–28).

In operation, valve assembly 10 is selectively and operatively disposed or secured within a vehicle of the type having a passenger compartment containing an amount of air which are desired to be transferred or expelled.

Particularly, assembly 10 is operatively secured to the body of a vehicle through an aperture or opening in the vehicle body, as previously described. Assembly 10 is attached so that aperture 41 is made to reside and/or communicate with the environment "outside" of or external to the vehicle while concomitantly allowing aperture 43 to reside and/or communicate with the interior of the vehicle (e.g., with the portion of the vehicle in which air is to be expelled). Aperture 43 is operatively and communicatively coupled to the passenger compartment of the vehicle in a conventional manner such as, by way of a passage, tube, duct, or conduit, and aperture 41 is made to operatively communicate with the environment "outside" of, external to and/or surrounding the vehicle or the vehicle's passenger compartment, thereby allowing air contained within the passenger compartment of the vehicle to be desirably and selectively expelled, exhausted and/or removed from the vehicle.

In such a manner, it should be appreciated that, assembly 10 may be used to selectively replace a conventional pressure relief valve (i.e., an "air extractor"). Assembly 10 is operatively coupled to a conduit leading from the passenger compartment in a manner which permits the "communication" or the passage of air from the passenger compartment to the exterior of the vehicle to occur primarily through assembly 10.

As the air resident or contained within the passenger compartment becomes pressurized, (e.g., the pressure within the passenger compartment becomes greater than the pressure outside the vehicle) the air is passed or "forced" through the conduit and into channel 40 of assembly 10 through aperture 43. As the air enters channel 40, members 51, 53, and 55 assist in "guiding" and/or directing the air through apertures 52–58 and flaps 14–20. As the pressurized air flows through apertures 52–58, flaps 14–20 respectfully pivot about axes 78–84 in the direction illustrated by arrow 90, thereby "uncovering" or opening apertures 52–58 and allowing the air and/or air-borne contaminants to be expelled through apertures 52–58 and aperture 43.

Figure 5:
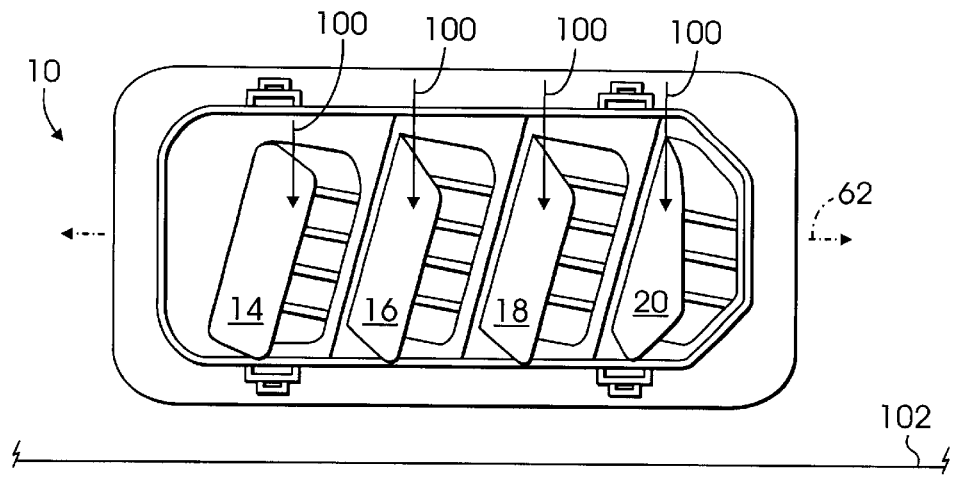
FIG. 5 illustrates the valve assembly shown in FIG. 1 in a substantially "horizontal" orientation.
Figure 6:
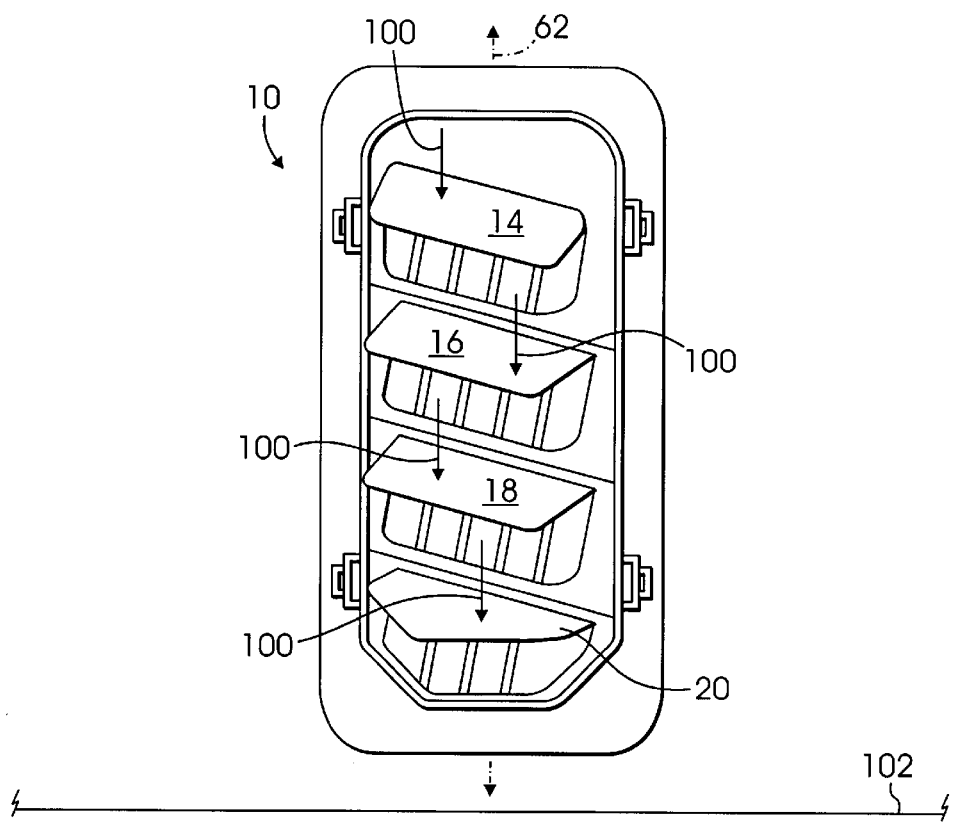
FIG. 6 illustrates the valve assembly shown in FIG. 1 in a substantially "vertically" orientation.

Once the pressure of the air within the passenger compartment is substantially equal to the pressure of the air and/or gas outside of the passenger compartment (e.g., once the pressure differential is substantially equalized or eliminated), the gravitational force which is imparted upon flaps 14–20, and which is illustrated by arrows 100 in FIGS. 5 and 6, causes flaps 14–20 to pivot back to their original "closed" positions, thereby respectively and operatively "covering" or closing apertures 52–58, and substantially preventing air and/or fumes from the exterior of the vehicle to enter into the passenger compartment through assembly 10.

It should be appreciated that assembly 10 may be operatively disposed in a substantially "horizontal" position with respect to the ground 102 (e.g., longitudinal axis 62 is disposed at approximately zero degree (0°) angle with respect to the ground or the floor 102 of the vehicle), as shown in FIG. 5, or in a substantially "vertical" position with respect to the ground or the floor surface 102 (e.g., longitudinal axis 62 is disposed at an approximately ninety degree (90°) angle with respect to the ground or the floor 102 of the vehicle), as shown in FIG. 6. Particularly, due to the "angled" position of flaps 14–20, gravitational force 100 will cause flaps 14–20 to close when axis 62 is disposed substantially horizontal or parallel (e.g., zero degrees (0°)) with respect to the ground or the floor surface 102; when axis 62 is disposed substantially vertical or perpendicular (e.g., ninety degrees (90°)) with respect to the ground or the floor surface 102; and in a number of other angular positions existing between the substantially "parallel" and "perpendicular" positions (e.g., any position from approximately zero degrees (0°) to approximately ninety degrees (90°)). In this manner, assembly 10 may be mounted in a variety of positions and orientations, thereby maximizing the areas or regions or portions of a vehicle in which assembly 10 can be mounted, and providing a "universal" valve assembly for use in a wide variety of vehicles.

It is understood that the invention is not limited by the exact construction or method illustrated and described above but that various changes and/or modifications may be made without departing from the spirit and/or the scope of the inventions.

What is claimed is:

1. A valve assembly for use in discharging air from a portion of a vehicle of the type having a floor, said valve assembly comprising:

a housing having a longitudinal axis which forms a first angle with said floor, said first angle having a value;

a first member which is disposed within said housing and which includes at least one opening through which air selectively passes; and at least one selectively movable second member which is pivotally coupled to said first member along an axis which forms a second angle with respect to said longitudinal axis, said second angle is an acute angle, being effective to cause said at least one movable second member to operatively and selectively cover said first opening when said value of said first angle is between approximately zero degrees and approximately ninety degrees.

2. The valve assembly of claim 1 wherein said second angle is an approximately equal to 45 degrees.

3. The valve assembly of claim 1 wherein said at least one opening comprises a plurality of substantially identical openings.

4. The valve assembly of claim 1 wherein said first member is integrally formed within said housing.

5. The valve assembly of claim 1 wherein said housing includes a first aperture which is substantially contained within a first plane and wherein said first member is substantially disposed within a second plane which intersects said first plane.

6. The valve assembly of claim 1 wherein said at least one aperture member is generally rectangular.

7. The valve assembly of claim 6 wherein said housing and said first member are moldably formed.

8. The valve assembly of claim 1 wherein said housing includes a peripherally disposed ridge having a front side and a back side.

9. The valve assembly of claim 8 wherein said vehicle further comprises a body having and interior surface and an exterior surface, said housing further including a plurality of fasteners, a first portion of said plurality of fasteners being disposed on said front side of said ridge and a second portion of said plurality of fasteners being disposed upon said back side of said ridge, thereby allowing said valve assembly to be selectively fastened to one of said interior and exterior surfaces of said body.

10. A valve assembly for use in combination with a vehicle of the type having a portion containing air, said valve assembly comprising:

a housing which is mounted within said vehicle and which is oriented within said vehicle in a certain manner;

a first member which is contained within said housing and which is communicatively coupled to said air containing portion, and which allows said contained air to be selectively discharged from said air containing portion; and a second member which is contained within said housing, and which is movable from a first position in which said second member allows said first member to discharge said air and a second position in which said second member overlays said first member, thereby preventing said first member from discharging said air, said second member being movable between said first and said second position independent of said orientation of said housing within said vehicle.

11. The valve assembly of claim 10 wherein said second member comprises a flap.

12. The valve assembly of claim 10 wherein said vehicle further comprises a body having an interior surface and an exterior surface, said valve assembly further comprising at first fastener and second fastener, which are coupled to said housing and which operatively extend in opposite directions, thereby allowing said assembly to be selectively fastened to one of said interior and exterior surfaces of said body.

13. A method for producing a valve assembly for use in discharging air from a passenger compartment of a vehicle of the type having a floor, said method comprising the steps of:

providing an elongated housing having at least one aperture through which said air may be selectively discharged and further having a longitudinal axis forming a first angle with said floor;

mounting the housing within the vehicle;

providing at least one member; and pivotally attaching said at least one member to said housing along an axis which forms a second angle with respect to said longitudinal axis, said second angle is an acute angle that is effective to cause said at least one member to be operatively movable from a first position in which said aperture is covered to a second position remote said apertures, said member being operatively movable between said first and said second positions when said first angle has a value between zero degrees and approximately ninety degrees.

14. The method of claim 13 further comprising the steps of:

attaching said valve assembly to a conduit; and connecting said conduit to said passenger compartment.

15. The method of claim 13 wherein said vehicle further comprises a body having and interior surface and an exterior surface, said method further comprising the steps of:

providing a first fastener and a second fastener; and disposing said first and said second fastener upon said housing effective to cause first and said second fastener to operatively extend in substantially opposite directions, thereby allowing said housing to be selectively fastened to one of said interior and exterior surfaces of said body.

16. The method of claim 15 wherein said first and said second fastener each comprise a clip.

17. The method of claim 13 wherein said housing is generally rectangular.

* * * * *